United States Patent
Kim (10) Patent No.: US 9,269,269 B2
(45) Date of Patent: Feb. 23, 2016

(54) BLIND SPOT WARNING SYSTEM AND METHOD

(71) Applicant: MANDO CORPORATION, Pyeongtaek-si, Gyeonggi-do (KR)

(72) Inventor: Nac Dong Kim, Uiwang-si (KR)

(73) Assignee: Mando Corporation, Gyeonggi-do (KR)

( * ) Notice: Subject to any disclaimer, the term of this patent is extended or adjusted under 35 U.S.C. 154(b) by 63 days.

(21) Appl. No.: 13/959,419

(22) Filed: Aug. 5, 2013

(65) Prior Publication Data

US 2014/0035738 A1 Feb. 6, 2014

(30) Foreign Application Priority Data

Aug. 6, 2012 (KR) .......................... 10-2012-0085832

(51) Int. Cl.
*G08G 1/16* (2006.01)
*B60W 30/12* (2006.01)
*B60W 50/14* (2012.01)

(52) U.S. Cl.
CPC ................ *G08G 1/167* (2013.01); *B60W 30/12* (2013.01); *B60W 50/14* (2013.01)

(58) Field of Classification Search
CPC ........... G08G 1/167; G08G 1/00; G08G 1/16; G08G 1/166; G08G 1/20; B60W 30/12
USPC ........ 340/435, 436, 901, 903; 701/41, 42, 48, 701/301, 117; 382/106
See application file for complete search history.

(56) References Cited

U.S. PATENT DOCUMENTS

| | | | | |
|---|---|---|---|---|
| 6,477,260 | B1 * | 11/2002 | Shimomura | 382/106 |
| 8,611,609 | B2 * | 12/2013 | Oyama | 382/104 |
| 2010/0100284 | A1 * | 4/2010 | Kudo et al. | 701/42 |

(Continued)

FOREIGN PATENT DOCUMENTS

| JP | 06-018657 A | 1/1994 |
|---|---|---|
| JP | 11-321494 A | 11/1999 |

(Continued)

OTHER PUBLICATIONS

Korean Office Action issued in corresponding Korean Patent Application No. 10-2012-0085832, mailed on Mar. 18, 2015; 5 pages in Korean language.

*Primary Examiner* — Van Trieu
(74) *Attorney, Agent, or Firm* — McDermott Will & Emery LLP (57) ABSTRACT

The present invention relates to a blind spot warning system and method for sensing a vehicle in a blind spot of a vehicle and warning thereof in advance, the blind spot warning system comprising a line-to-line space-generating unit that generates, in real time, line-to-line space data, which changes when the host vehicle is driven; a distance-measuring unit, which measures the distance between the host vehicle and a target vehicle located in a blind spot of the host vehicle; an input unit, which receives the line-to-line space data and the distance measurement information; a comparison unit, which compares the target vehicle distance data with the line-to-line space data to decide whether the target vehicle is located within the threshold vehicle-to-vehicle distance; and a warning output unit for outputting a warning if the target vehicle is located within the threshold vehicle-to-vehicle distance in the blind spot.

8 Claims, 6 Drawing Sheets

(56) References Cited

U.S. PATENT DOCUMENTS

2012/0053795 A1* 3/2012 Bos et al. .................. 701/48
2012/0057757 A1* 3/2012 Oyama .................. 382/104

FOREIGN PATENT DOCUMENTS

| JP | 2011-141746 A | 7/2011 |
|----|---------------|--------|
| KR | 10-1998-058687 | 10/1998 |

* cited by examiner

BLIND SPOT WARNING SYSTEM AND METHOD

CROSS-REFERENCE(S) TO RELATED APPLICATIONS

This application claims priority to Korean Patent Application No. 10-2012-0085832, filed on Aug. 6, 2012, which is incorporated herein by reference in its entirety.

BACKGROUND OF THE INVENTION

1. Field of the Invention

The present invention relates to a blind spot warning system and method, and in particular, to a blind spot warning system and method for sensing a vehicle located in a blind spot formed at a posterolateral area of a host vehicle and announcing it in advance.

2. Description of Related Art

A blind spot warning system ("BSW system") refers to a system that senses a target vehicle that approaches a side blind spot or a rear blind spot of a host vehicle and announces it in advance. Most blind spot warning systems utilize an ultrasonic sensor or laser sensor for sensing objects around the host vehicle. An example of such blind spot warning systems is disclosed in Korean Patent Laid-Open Publication No. 1998-058678 (Oct. 7, 1998).

Due to the characteristics of the ultrasonic sensor or the laser sensor, the conventional blind spot warning system cannot recognize the lines on the road. That is, since the conventional blind spot warning system measures the distance between the host vehicle and the target vehicle on the basis of a pre-set lane width, this blind spot warning system is disadvantageous in that the rate of occurrence of malfunctions is high and in that the reliability of the warning system is deteriorated under the condition where a lane width is changed.

According to the regulations of the Road Traffic Act in Korea, in practice, the line-to-line space, i.e., the lane width, is prescribed at roughly 3 meters or more, or 275 centimeters or more when a left turn only lane is provided. Thus, the lane width is variously determined according to the road environment, such as the total width of the road and similar factors. For example, public roads or highways have various lane widths, among them widths of approximately 275 centimeters, approximately 300 centimeters, approximately 350 centimeters and approximately 400 centimeters. Accordingly, since the conventional blind spot warning system mounted in the host vehicle judges whether the target vehicle is located in the side region or rear region of the host vehicle on the basis of a fixed lane width that has been pre-set, target vehicle recognition errors frequently cause the blind spot warning system to malfunction.

SUMMARY OF THE INVENTION

The present invention has been conceived to solve the above-mentioned problems with the conventional technique, and an object of the present invention is to provide a blind spot warning system and a method that can determine the line-to-line space in real time and utilize it as a threshold vehicle-to-vehicle distance to prevent malfunctions and erroneous sensing of target vehicles located out of the threshold range in a blind spot warning system operated when a host vehicle is driven on a road.

In addition, an object of the present invention is to provide a blind spot warning system and a method that can determine the line-to-line space data from a lane keeping assistance system (LKAS) mounted in the host vehicle and utilize it to prevent malfunctions and mistaken sensing of a target vehicle in a blind spot warning system operated when a host vehicle is driven on a road.

In order to realize the above technical solutions, a blind spot warning system for warning that a target vehicle is located in a blind spot that exists in a posterolateral area of a host vehicle according to one aspect of the present invention comprises a line-to-line space-generating unit, which generates, in real time, the line-to-line space data for the lane width, which changes when the host vehicle is driven; at least one distance-measuring unit, which measures the distance between the host vehicle and a target vehicle located in a side zone or a rear zone of the host vehicle; an input unit, which receives the line-to-line space data from the line-to-line space-generating unit and receives the distance measurement information from the distance-measuring unit; a comparison unit, which compares the target vehicle distance data, based on the distance measurement information transferred from the distance-measuring unit, with the line-to-line space data in order to decide whether the target vehicle is located within the threshold vehicle-to-vehicle distance determined based on the line-to-line space data; and a warning output unit for outputting a warning if the target vehicle is located within the threshold vehicle-to-vehicle distance in a blind spot formed at the posterolateral area of the host vehicle.

In one embodiment, the line-to-line space-generating unit is provided with an image-acquiring unit, which films the line at the host vehicle to generate an image of the line; and an image-processing unit for deciphering the image of the line to generate the line-to-line space data.

In one embodiment, the line-to-line space-generating unit corresponds to at least some functional part of a lane keeping assistance system outputting the line-to-line space data, mounted in the host vehicle for warning of lane departure by the host vehicle.

In one embodiment, the blind spot warning system is further provided with a conversion unit for converting the line-to-line space data received from the line-to-line space-generating unit via the input unit into the data for the threshold vehicle-to-vehicle distance.

In one embodiment, the warning output unit has a display device for displaying the host vehicle and the target vehicle on a screen.

A blind spot warning method for warning whether a target vehicle is located in a blind spot formed at a posterolateral area of a host vehicle in the blind spot warning system mounted in a host vehicle according to one embodiment of the present invention comprises the steps of generating, in real time, the line-to-line space data with respect to the lane width of a road, which changes when the host vehicle is driven, through a line-to-line space-generating unit; measuring the distance between the host vehicle and a target vehicle located in a side zone or a rear zone of the host vehicle, while the host vehicle is being driven; receiving the line-to-line space data from the line-to-line space-generating unit and receiving the distance measurement information from a distance-measuring unit; generating the target vehicle distance data on the basis of the distance measurement information from a distance-measuring unit; comparing the target vehicle distance data with the line-to-line space data to decide whether the target vehicle is located within the threshold vehicle-to-vehicle distance determined based on the line-to-line space data; and outputting a warning if the target vehicle is located within the threshold vehicle-to-vehicle distance in the blind spot formed at the posterolateral area of the host vehicle.

In one embodiment, the step of generating the line-to-line space data comprises the step of filming a line at the host vehicle to generate an image of the line and the step of deciphering the image of the line to generate the line-to-line space data.

In one embodiment, the step of generating the line-to-line space data comprises the step of acquiring the line-to-line space data from a lane keeping assistance system mounted in the host vehicle for warning of lane departure by the host vehicle.

In one embodiment, the blind spot warning method further comprises the step of generating the threshold vehicle-to-vehicle distance on the basis of the line-to-line space data after the line-to-line space data is received from the line-to-line space-generating unit.

In one embodiment, the step of outputting the warning signal comprises the step of outputting a warning through a display device that displays the host vehicle and the target vehicle.

According to the present invention, it is possible to provide a blind spot warning system and method that can generate line-to-line space data in real time and utilizes it as a threshold vehicle-to-vehicle distance to prevent malfunctions and mistaken sensing of a target vehicle located out of the threshold range in the blind spot warning system, which is operated when a host vehicle is driven on a road.

In addition, according to the present invention, it is possible to provide a blind spot warning system and method that can acquire the line-to-line space data from a lane keeping assistance system mounted in the host vehicle and utilize it to prevent malfunctions and mistaken sensing of a target vehicle in the blind spot warning system, which is operated when a host vehicle is driven on a road.

DESCRIPTION OF SPECIFIC EMBODIMENTS

Objects, specific advantages and novel characteristics of the present invention will become more apparent from the following detailed description and the preferred embodiment in connection with the accompanying drawings.

A preferred embodiment of the present invention will be described below in more detail with reference to the accompanying drawings.

Figure 1:
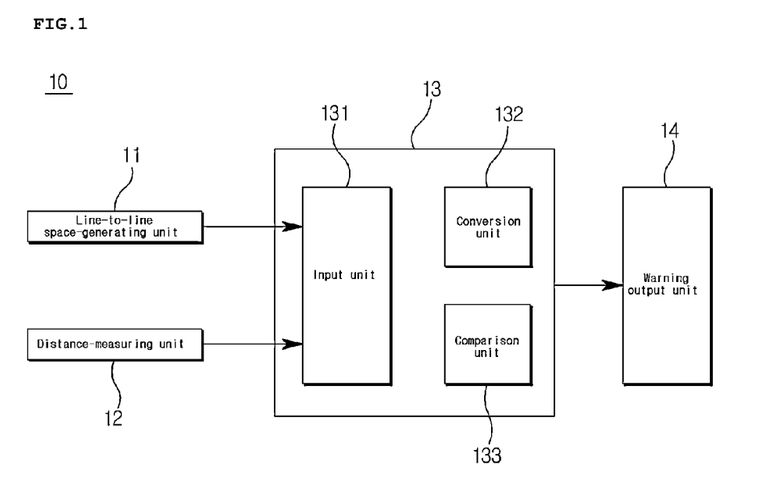
FIG. 1 is a schematic block diagram of a blind spot warning system in accordance with one embodiment of the present invention.

FIG. 1 is a schematic block diagram of a blind spot warning system in accordance with one embodiment of the present invention.

Referring to FIG. 1, the blind spot warning system 10 in accordance with this embodiment includes a line-to-line space-generating unit 11, a distance-measuring unit 12, an input unit 131, a comparison unit 133 and a warning output unit 14 for accurately sensing a target vehicle located in the side zone or in the rear zone of a host vehicle and generating a reliable warning.

The line-to-line space-generating unit 11 generates, in real time, the line-to-line space data with respect to the lane width, which changes when a host vehicle is driven. The line-to-line space-generating unit 11 may be embodied by a means for recognizing a line on the road on which the host vehicle is being driven and detecting the distance between the recognized lines or a structure performing a function corresponding to that of the above means. The line-to-line space data, which is generated in the line-to-line space-generating unit 11 and shows the line-to-line space or the lane width, may be output from the line-to-line space-generating unit 11 in real time along with the information on values that differ from each other according to the conditions of the road on which the host vehicle is being driven.

The distance-measuring unit 12 measures the distance between the host vehicle and a target vehicle located in a side zone or a rear zone of the host vehicle. Here, the target vehicle includes vehicles driven around the host vehicle. The distance-measuring unit 12 refers to a means mounted in the host vehicle for measuring the distance between the host vehicle and the target vehicle around the host vehicle or a structure performing a function corresponding to that of the above means. The distance-measuring unit 12 may be embodied by an ultrasonic sensor, laser sensor or any kinds of sensor that performs a function similar to that of the above sensors. The distance-measuring unit 12 may include one or two or more sensors.

The input unit 131 receives the line space data from the line-to-line space-generating unit 11 and receives the distance measurement information from the distance-measuring unit 12. The input unit 131 refers to a means connected to the line-to-line space-generating unit 11, a means connected to the distance-measuring unit 12, or at least one structure performing a function corresponding to that of each of the above means. The input unit 131 may be embodied by a communication interface, an analog/digital converter, a digital/digital converter, or any combination thereof. The communication interface includes an interface for controller area network (CAN) communication.

The comparison unit 133 compares the target vehicle distance data, based on the distance measurement information transferred from the distance-measuring unit, with the line-to-line space data in order to decide whether the target vehicle is located within the threshold vehicle-to-vehicle distance determined based on the line-to-line space data. The comparison unit 133 refers to a means for comparing the two data items with each other, a means for comparing one piece of data with the criterion data, or a structure performing a function corresponding to that of either of the above means. The comparison unit 133 may be embodied by some functional part of a control unit for a blind spot warning of the present embodiment or a structure performing a function corresponding to that of the above functional unit. In addition, the comparison unit 133 may be embodied by a blind spot warning functional part mounted in one of a plurality of control units installed in a vehicle for performing a blind spot warning function or a structure performing a function corresponding to that of the above functional part.

The input unit 131 and the comparison unit 133 as described above may correspond to a microprocessor provided in a single control unit and at least one portion of an input end of the microprocessor.

The warning output unit 14 outputs a warning if the target vehicle is located within the threshold vehicle-to-vehicle distance in the blind spot formed at the posterolateral area of the host vehicle. The warning output unit 14 refers to a means for outputting a warning in response to a control signal output from the comparison unit 133 or a structure performing a function corresponding to that of the above means. The above warning output unit 14 may be embodied by a device that can output sound, light, or vibration as a warning message. For example, the warning output unit may include a display device. In this case, the warning output unit 14 may be a display device for displaying the host vehicle and the target vehicle on a screen to perform a blind spot warning function, and this display device may be a device having a navigation function.

Meanwhile, the blind spot warning system 10 in accordance with the embodiment may further comprise a conversion unit 132, and this conversion unit 132 may be in charge of converting the line-to-line space data, received from the line-to-line space-generating unit 11 via the input unit 131, into the threshold vehicle-to-vehicle distance. Together with the conversion unit 132, the input unit 131 and the comparison unit 133 may be embodied as a signal-processing unit 13 formed in a single module. The signal-processing unit 13 may correspond to some functional part in a microprocessor performing a procedure that is pre-set by a program stored in a storage unit, such as a memory, or by software, or a structure performing a function corresponding to that of the above functional part.

Figure 2:
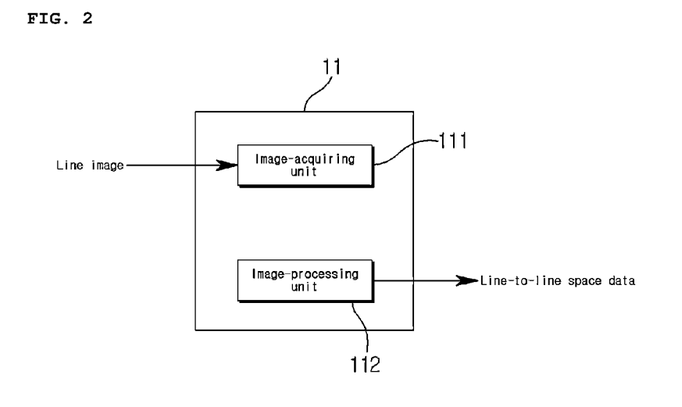
FIG. 2 is a schematic block diagram of a line-to-line space-generating unit of the blind spot warning system shown in FIG. 1.

FIG. 2 is a schematic block diagram of the line-to-line space-generating unit of the blind spot warning system shown in FIG. 1.

Referring to FIG. 2, the blind spot warning system according to the embodiment may be provided with a device functioning as the line-to-line space-generating unit 11, which recognizes the lines and the line-to-line space using at least one camera.

More concretely, the line-to-line space-generating unit 11 may be provided with an image-acquiring unit 111 and an image-processing unit 112. In this case, the image-acquiring unit 111 refers to a means for filming the line at the host vehicle to generate an image of the line or a structure performing a function which corresponds to that of the above means, and the image-processing unit 112 refers to a means for deciphering the line image transmitted from the image-acquiring unit 111 to generate the line-to-line space data or a structure performing a function which corresponds to that of the above means. The image-acquiring unit 111 may be at least one camera mounted in the host vehicle that films the situation in front of the host vehicle, which is being driven on the road. The image-processing unit 112 may be one of conventional various kinds of image-processing devices which process the line image.

According to the line-to-line space-generating unit 11 of this embodiment, the image of the lines, which differ from each other according to a road structure or the road environment, is acquired while the host vehicle is being driven, the acquired line image is deciphered, and the line-to-line space data showing the line-to-line space in real time can be output. Due to the above, the blind spot warning system can accurately sense target vehicles around the host vehicle.

Figure 3:
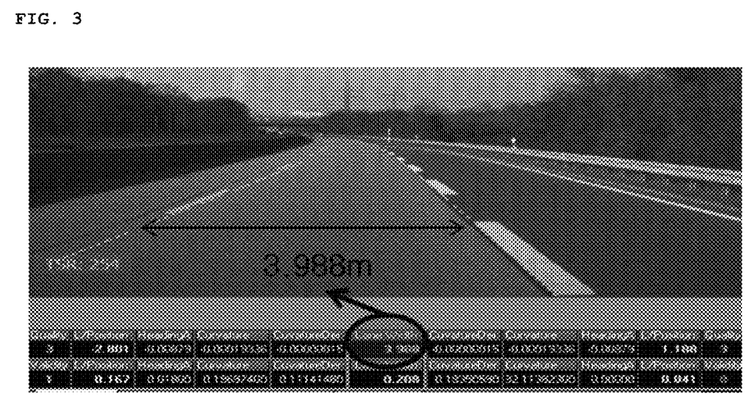
FIG. 3 is a photograph illustrating a lane keeping assistance system which is applicable to a line-to-line space-generating unit of the blind spot warning system shown in FIG. 1.

FIG. 3 is a photograph illustrating a lane keeping assistance system that is applicable to the line-to-line space-generating unit of the blind spot warning system shown in FIG. 1.

Referring to FIG. 3, as the line-to-line space-generating unit, the blind spot warning system according to the embodiment may be provided with a device that recognizes the lines and the line-to-line space using one camera and outputs the line-to-line space data in real time.

More concretely, the line-to-line space-generating unit may be embodied by utilizing the lane keeping assistance system. In this case, the line-to-line space-generating unit may be the lane keeping assistance system, and in this case, at least one output end of the lane keeping assistance system is connected to the input unit (Reference number 131 in FIG. 1), and may be synchronized with the comparison unit (Reference number 133 in FIG. 1) to provide the comparison unit with the line-to-line space data in a predetermined time cycle. The lane keeping assistance system that can be utilized in the line-to-line space-generating unit of this embodiment may have a function of outputting the information on a road width to the display device in real time as shown in FIG. 3.

In another embodiment, the line-to-line space-generating unit may correspond to a means for receiving the line-to-line space data from the lane keeping assistance system and transmitting the received line-to-line space data to the input unit or a structure performing a function corresponding to that of the above means. This line-to-line space-generating unit may be provided in a lane keeping assistance system that is mounted in the host vehicle to assist in lane keeping by the host vehicle or to warn of lane departure by the host vehicle. The lane keeping assistance system may correspond to a lane departure warning system.

According to the aforementioned embodiment, by utilizing the line-to-line space data recognized in the lane keeping assistance system or the lane departure warning system, the threshold vehicle-to-vehicle distance of the blind spot warning system is accurately generated in real time, and so inaccurate sensing and malfunctions of the blind spot warning system can be prevented.

Figure 4:
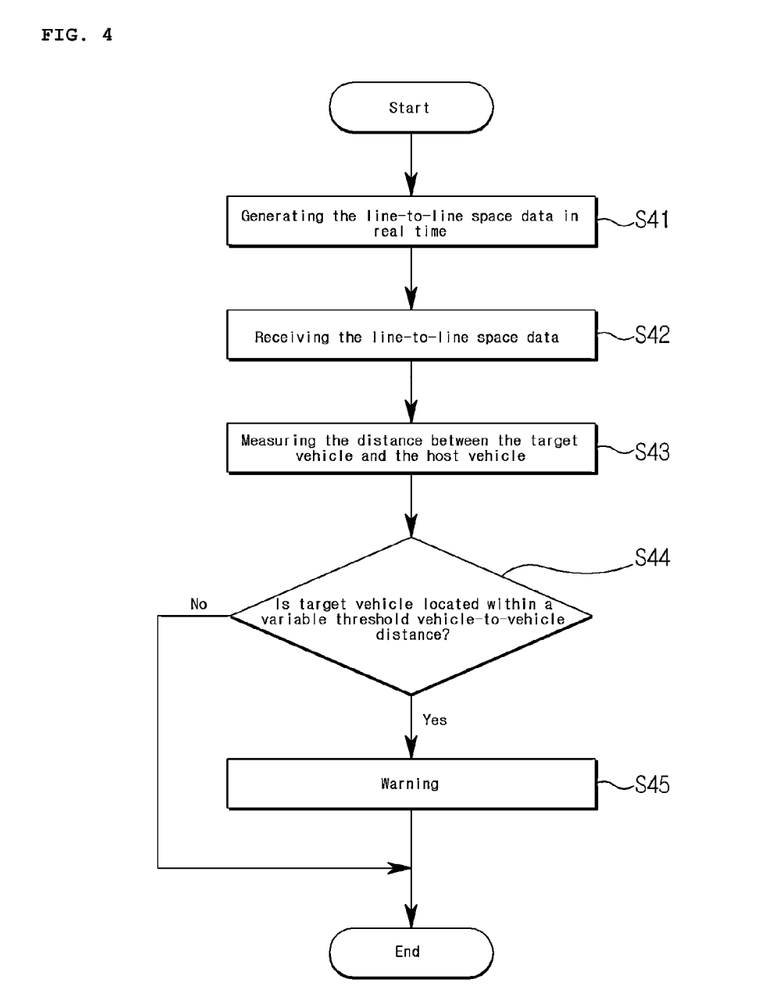
FIG. 4 is a schematic flow chart for illustrating a blind spot warning method in accordance with one embodiment of the present invention.

FIG. 4 is a schematic flow chart for illustrating the blind spot warning method in accordance with one embodiment of the present invention.

Below, the blind spot warning method in accordance with the embodiment is illustrated with reference to FIG. 4. First of all, the line-to-line space data is generated in the line-to-line space-generating unit in real time while the host vehicle is being driven (S41). Additionally, the input unit periodically receives the line-to-line space data transmitted from the line-to-line space-generating unit (S42). The interval at which the line-to-line space data is received may be changed by adjusting the performance of the line-to-line space-generating unit or a predetermined setting value.

The structure for generating the line-to-line space data in real time may be embodied such that the line is captured by the host vehicle to generate the line image and the generated line image is then deciphered to generate the line-to-line space data. In addition, the structure for generating the line-to-line space data in real time may be embodied such that the line-to-line space data can be obtained from the lane keep assistance system or the lane departure warning system, which are mounted in the host vehicle to warn of lane departure by the host vehicle.

Next, the distance between the host vehicle and a target vehicle that is being driven around the host vehicle is measured in the distance-measuring unit (S43). Distance measurement with respect to the target vehicle can be periodically performed, or alternatively it is possible to set the distance-measuring unit to measure the distance from the target vehicle when the target vehicle is located within a certain distance. Here, the above certain distance corresponds to a distance that is greater than the threshold vehicle-to-vehicle distance utilized in the blind spot warning system.

Then, the comparison unit judges whether the target vehicle is located within the threshold vehicle-to-vehicle distance, which changes according to the variable lane width (S44). On the basis of the line-to-line space of the lane on which the host vehicle is being driven, the threshold vehicle-to-vehicle distance may be set on the basis of a pre-set fixed value, which is further considered for the line-to-line space, which can change according to the conditions of the road on which the host vehicle is being driven. Here, the pre-set fixed value may be the width of the host vehicle or a value obtained by subtracting the width of the host vehicle from the line-to-line space.

Next, as a result of judgment in the comparison unit, if the target vehicle is determined to be located within the threshold vehicle-to-vehicle distance, the warning output unit outputs the warning in the predetermined manner or form (S45). The warning of the approach of the target vehicle in the blind spot may be output in the form of a sound and/or an image from a display device that displays the host vehicle and the target vehicle on the screen.

According to the present embodiment, the blind spot warning system mounted in the host vehicle can accurately recognize whether the target vehicle is located within a certain distance in the blind spot of the host vehicle, and by means of the above system, it is possible to provide a highly reliable blind spot warning method by which mistaken sensing or malfunctions of the blind spot warning system occur less frequently.

Figure 5:
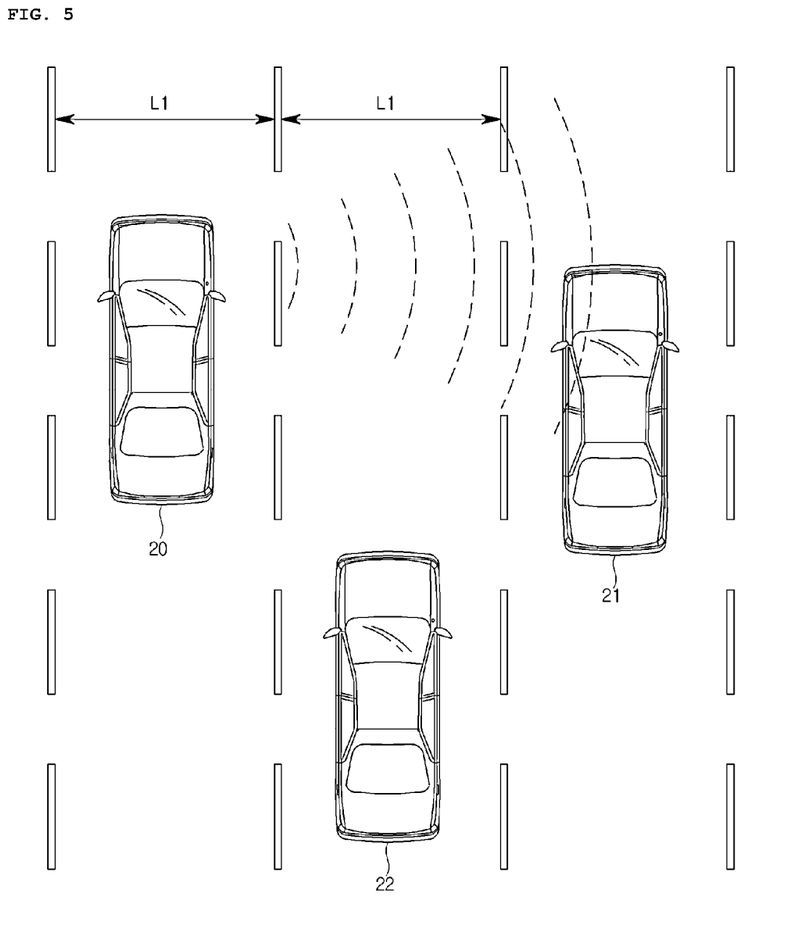
FIGS. 5 to 7 are views for illustrating the main process of operating a blind spot warning system and a method of the present invention.
Figure 6:
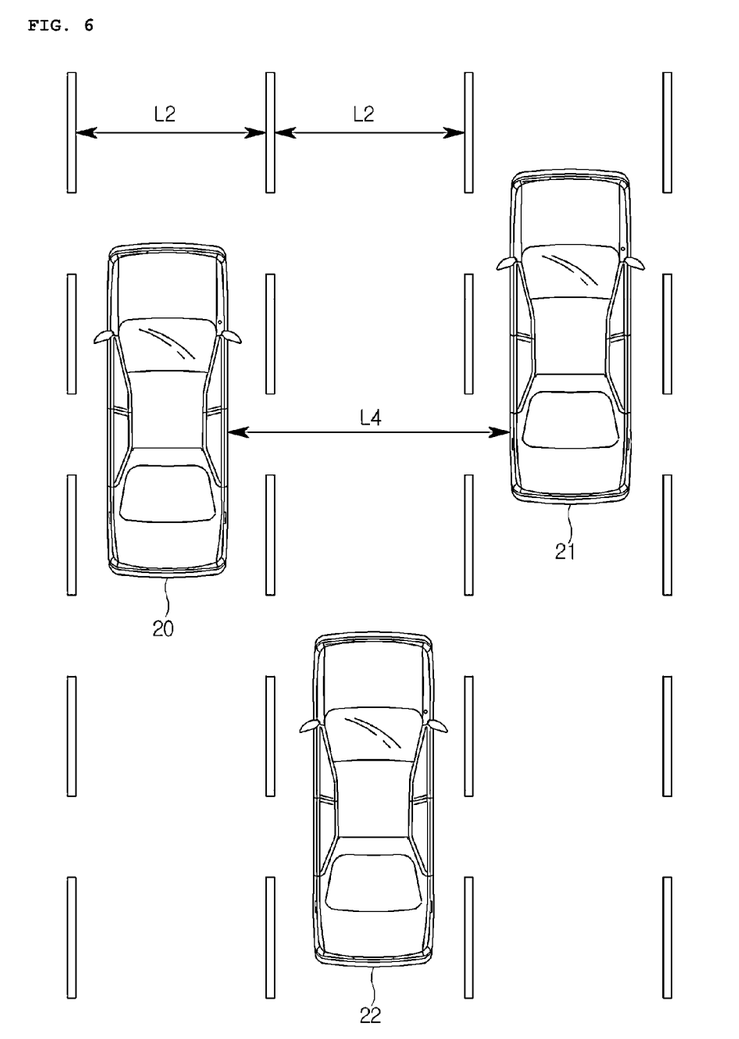
Figure 7:
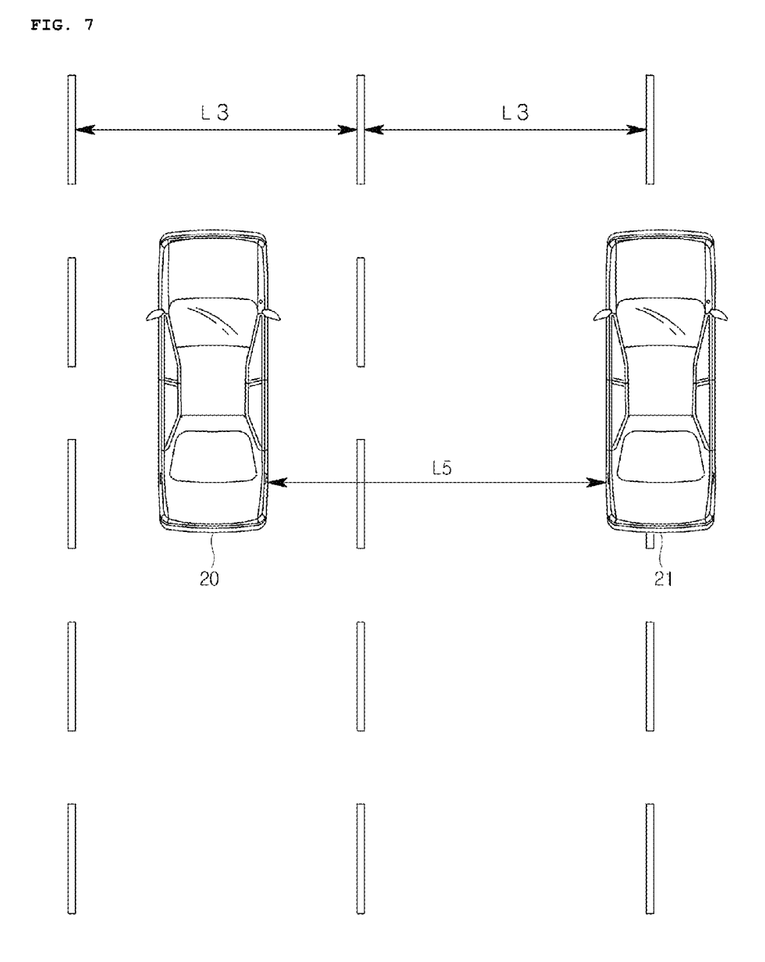

FIGS. 5 to 7 are views illustrating the main process of operating the blind spot warning system and the blind spot warning method of the present invention.

Referring to FIG. 5, a host vehicle 20 senses whether vehicles 21, 22 are around the host vehicle or are approaching the host vehicle through an ultrasonic sensor or a laser sensor while the host vehicle is being driven on the road. FIG. 5 shows that lanes having a first line-to-line space L1 are provided on the road, the host vehicle 20 is being driven in the second lane, one target vehicle 21 is being driven in the fourth lane, and another target vehicle 22 is being driven in the third lane.

Referring to FIG. 6, when the host vehicle 20 is driven on the road in which the lanes having a second line-to-line space L2 that is narrower than the first line-to-line space L1 are provided, the blind spot warning system of the present embodiment can watch the target vehicles 21, 22 around the host vehicle on the basis of the new threshold vehicle-to-vehicle distance, which is based on the new second line-to-line space L2 to which the first line-to-line space L1 is changed.

For example, when the target vehicle 21 is driven in a lane (fourth lane) that is two lanes away from the lane (second lane) in which the host vehicle 20 is driven, even if the driver of the target vehicle 21 does not intend to change his/her lane to the lane (third lane) adjacent to the lane in which the host vehicle is being driven, a conventional type system (blind spot warning system), in which the technology of the present invention is not applied, can mistakenly recognize the target vehicle 21 to be encroaching in the lane adjacent to the lane in which the host vehicle 20 is being driven, and then output a warning.

However, the blind spot warning system according to the present embodiment can accurately judge that the distance L4 between the host vehicle 20 and the target vehicle 21 is greater than the second line-to-line space L2 on the basis of a new threshold vehicle-to-vehicle distance, which is based on the narrowed line-to-line space L2. On the basis of the above judgment, it is possible to assume that the driver of the target vehicle 21 does not intend to change from his/her lane (fourth lane) to the third lane and to approach a side area, and so mistaken sensing and malfunctions of the system can be effectively prevented.

Referring to FIG. 7, when the host vehicle 20 is driven on a road in which lanes having a third line-to-line space L3, which is greater than the first line-to-line space L1, are provided, the blind spot warning system of the present embodiment can watch the target vehicle 21 near the host vehicle on the basis of a new threshold vehicle-to-vehicle distance, which is based on the new third line-to-line space L3, to which the first line-to-line space L1 is changed.

For example, when the driver of a target vehicle 21 being driven in a lane (fourth lane) that is two lanes away from the lane (second lane) in which the host vehicle 20 is being driven tries to change his/her lane to the next lane (third lane), even if the driver of the target vehicle 21 changes to the next lane (third lane), which is next to the lane of the host vehicle, a conventional type system (blind spot warning system), to which the technology of the present invention is not applied, cannot recognize that the target vehicle 21 has changed lanes and is encroaching on the lane next to the lane in which the host vehicle 20 is being driven, and cannot output a warning.

However, the blind spot warning system according to the present embodiment can accurately judge that the distance L5 between the host vehicle 20 and the target vehicle 21 is smaller than the third line-to-line space L3 on the basis of a new threshold vehicle-to-vehicle distance, which is based on the widened line-to-line space L3. On the basis of the above judgment, the blind spot warning system can recognize that the target vehicle 21 has changes from its lane (fourth lane) to the third lane and is encroaching on the right side area of the host vehicle 20, and can properly output a warning.

According to the embodiment described above, it is possible to accurately sense whether the target vehicle is approaching the host vehicle in the blind spot when the host vehicle is being driven on the road, and so mistaken sensing and malfunctions of the system can be effectively prevented.

While a specific embodiment of the present invention has been shown and illustrated, the present invention is not limited to the above-mentioned embodiment, and it should be understood by those skilled in the art that various changes and modification may be made without departing from the spirit and scope of the invention as defined by the appended claims.

What is claimed is:

1. A blind spot warning system for warning whether a target vehicle is located in a blind spot formed at a postero-lateral area of a host vehicle, the system comprising;

a line-to-line space-generating unit generating line-to-line space data with respect to a lane width, which changes when the host vehicle is driven, in real time;

at least one distance-measuring unit measuring a distance between the host vehicle and a target vehicle located in a side zone or a rear zone of the host vehicle;

an input unit receiving the line-to-line space data from the line-to-line space-generating unit and receiving distance measurement information from the distance-measuring unit;

a comparison unit comparing target vehicle distance data based on the distance measurement information transferred from the distance-measuring unit with the line-to-line space data to decide whether the target vehicle is located within a threshold vehicle-to-vehicle distance determined based on the line-to-line space data;

a conversion unit for converting the line-to-line space data received from the line-to-line space-generating unit via the input unit into data for the threshold vehicle-to-vehicle distance; and a warning output unit outputting a warning if the target vehicle is located within the threshold vehicle-to-vehicle distance in the blind spot formed at the posterolateral area of the host vehicle.

2. The blind spot warning system of claim 1, wherein the line-to-line space-generating unit comprises an image-acquiring unit, which films a line at the host vehicle to generate an image of the line; and an image-processing unit for deciphering the line image to generate the line-to-line space data.

3. The blind spot warning system of claim 1, wherein the line-to-line space-generating unit comprises at least some functional part of a lane keeping assistance system mounted in the host vehicle for warning of lane departure by the host vehicle.

4. The blind spot warning system of claim 1, wherein the warning output unit comprises a display device for displaying the host vehicle and the target vehicle on a screen.

5. A blind spot warning method for warning whether a target vehicle is located in a blind spot formed at a posterolateral area of a host vehicle in a blind spot warning system mounted in the host vehicle, the method comprising steps of;

generating line-to-line space data with respect to a lane width of a road, which changes when the host vehicle is driven, through a line-to-line space-generating unit in real time;

measuring a distance between the host vehicle and a target vehicle which is located in a side zone or a rear zone of the host vehicle, during driving of the host vehicle;

receiving the line-to-line space data from the line-to-line space-generating unit and receiving distance measurement information from a distance-measuring unit;

generating target vehicle distance data based on of the distance measurement information from the distance-measuring unit;

comparing the target vehicle distance data with the line-to-line space data to decide whether the target vehicle is located within a threshold vehicle-to-vehicle distance, which is determined based on the line-to-line space data;

a step of generating the threshold vehicle-to-vehicle distance based on the line-to-line space data after the line-to-line space data is received from the line-to-line space-generating unit; and outputting a warning if the target vehicle is located within the threshold vehicle-to-vehicle distance in the blind spot formed at the posterolateral area of the host vehicle.

6. The blind spot warning method of claim 5, wherein the step of generating the line-to-line space data comprises steps of filming a line at the host vehicle to generate an image of the line and deciphering the image of the line to generate the line-to-line space data.

7. The blind spot warning method of claim 5, wherein the step of generating the line-to-line space data comprises a step of acquiring the line-to-line space data from a lane keeping assistance system mounted in the host vehicle for warning of lane departure by the host vehicle.

8. The blind spot warning method of claim 5, wherein the step of outputting the warning signal comprises a step of outputting the warning through a display device that displays the host vehicle and the target vehicle.

* * * * *